| United States Patent [19] | [11] Patent Number: 4,547,418 |
| Shigeta et al. | [45] Date of Patent: Oct. 15, 1985 |

[54] RIBBED SUBSTRATE FOR FUEL CELL ELECTRODE

[75] Inventors: Masatomo Shigeta; Hiroyuki Fukuda, both of Iwaki, Japan

[73] Assignee: Kureha Kagaku Kogyo Kabushiki Kaisha, Tokyo, Japan

[21] Appl. No.: 523,661

[22] Filed: Aug. 15, 1983

[30] Foreign Application Priority Data

Aug. 24, 1982 [JP] Japan ................................ 57-146691

[51] Int. Cl.$^4$ .......................... B32B 3/30; B32B 33/00
[52] U.S. Cl. .................................... 428/167; 428/170; 428/172; 428/218; 428/304.4; 428/316.6; 429/40
[58] Field of Search ............... 428/167, 170, 172, 212, 428/218, 304.4, 311.5, 316.6; 429/40, 41, 44

[56] References Cited

U.S. PATENT DOCUMENTS

| 3,829,327 | 8/1974 | Omori | 117/226 |
| 3,998,689 | 12/1976 | Kitago | 162/136 |
| 4,348,268 | 9/1982 | Müller | 429/40 |
| 4,374,906 | 2/1983 | Breault et al. | 429/44 |

FOREIGN PATENT DOCUMENTS 2095656  10/1982  United Kingdom .

*Primary Examiner*—Paul J. Thibodeau
*Attorney, Agent, or Firm*—Lyon & Lyon

[57] ABSTRACT

A porous ribbed substrate for a fuel cell electrode is herein disclosed which has a ribbed layer on one side and a non-ribbed layer on the other side, the non-ribbed layer having a bulk density smaller than the bulk density of the ribbed layer. The fuel cell electrode substrate has a porosity of 50–80% and good mechanical strength such as a bending strength of not less than 50 kg/cm$^2$. A fuel cell prepared from the electrode substrate has excellent properties.

3 Claims, No Drawings

RIBBED SUBSTRATE FOR FUEL CELL ELECTRODE

The present invention relates to a fuel cell electrode substrate, particularly an electrode substrate having a double layer structure, that is herein termed by "a ribbed layer" and "a non-ribbed layer", each layer having different properties from one another.

A ribbed electrode substrate for a monopolar fuel cell has been developed which has a ribbed surface on one side and on the other side a flat surface with a catalyst layer on the surface thereof. Such an electrode substrate is carbonaceous and porous as a whole. A cell is composed of two electrode substrates with a catalyst layer and a matrix therebetween for holding electrolyte. In a stack of such cells to form a fuel cell, a separator plate is disposed between two adjacent cells in contact with ribs of the substrate. Reactant gases (hydrogen as a fuel gas and oxygen or air) are fed via channels formed between the ribs and the separator plate and the gases diffuse from the ribbed surface to the flat surface in the electrode substrate to reach the catalyst layer.

For preparing such an electrode substrate, the following methods previously proposed may be used. For example, one method for preparing a general electrode substrate was proposed in Japanese Patent Application Laying Open No. 166354/82 wherein a mixture based on short carbonaceous fibers is pressed to form a porous shaped article. Another proposed method was described in Japanese Patent Publication No. 18603/78 in which method a machined paper of carbon fibers is impregnated with an organic polymer solution and is made into a porous carbon fiber paper. A still another method for preparing an electrode substrate was proposed in U.S. Pat. No. 3,829,327 wherein a web of carbon fibers is subjected to chemical vapor deposition of carbon to form a porous electrode substrate. These electrode substrates have substantially homogeneous monolayer structures.

Such a homogeneous monolayer electrode substrate has, however, demerits such as follows: with a high bulk density of a substrate, there is obtained a low limiting current density due to less diffusion of reactant gases and a rapid deterioration of performance of a fuel cell due to insufficient storage of electrolyte in the substrate, and therefore the life of a fuel cell is shortened; on the other hand, demerits are high electric and thermal resistance and a low mechanical strength such as a bending strength, with a low bulk density of an electrode substrate.

It is an object of the present invention to provide an electrode substrate without such demerits.

Another object of the invention is to provide a fuel cell electrode substrate having a double layer structure, each layer having different properties from each other.

A still another object of the invention is to provide a ribbed porous electrode substrate with excellent properties for a fuel cell.

A still further object of the present invention is to provide an electrode substrate for a fuel cell having a high mechanical strength such as a bending strength and a high porosity.

An electrode substrate to be provided according to the present invention having two layers with different bulk densities, that is a non-ribbed layer with a lower bulk density and a ribbed layer with a higher bulk density.

The ribbed layer of the electrode substrate of the present invention has ribs on the outer surface thereof to be abutted to a separator plate in a fuel cell. The ribs may form together with the separator U-shaped channels for feeding reactant gases. The ribbed layer of the substrate preferably has a bulk density of 0.5-0.8 g/cm$^3$ in order to provide the electrode substrate with a desired mechanical strength such as a bending strength of not less than 50 kg/cm$^2$. The thickness of the ribbed layer except ribs is from ¼ to 5/6 of the total thickness of the electrode substrate minus a thickness of the ribs.

The non-ribbed layer of the electrode substrate according to the invention has a flat surface on the outer side thereof and a bulk density lower than the bulk density of the ribbed layer. The bulk density of the non-ribbed layer is preferably in the range of 0.4-0.6 g/cm$^3$ for a desired diffusion or permeation of reactant gases and for a desired holding of a given amount of catalyst and electrolyte.

Generally, it is desirable for a fuel cell that a good diffusion of reactant gases through pores in the electrode substrate is maintained in the whole part of the substrate. In the present invention, the electrode substrate is porous as a whole and has a porosity of 50-80% and not less than 70% of the pores are open pores. Furthermore, the diameter of pores in the substrate of the invention is distributed in a narrow range, that is to say, not less than 60% of the pores have diameter in the range of 5-50 μm, this sharp distribution of pore diameter resulting in a better application of the electrode substrate of the invention to a fuel cell.

The electrode substrate of the present invention may be prepared by various methods, for example pressing process, paper-machining process or coating process. In the pressing process, raw materials for each layer, i.e. a non-ribbed layer and a ribbed layer, are separately supplied into a die having a predetermined configuration and pressed while heating. In the paper-machining process, a machined paper of mixed carbon fibers as a non-ribbed layer is laminated onto a pressed part prepared from the same raw material as the pressing process for a ribbed layer. In the third method (the coating process), a mixture of a filler e.g. active carbon or carbon black and a thermosetting resin e.g. a liquid phenol resin (in an alcohol as a solvent) as a non-ribbed layer is coated onto a pressed part prepared from the same raw material as the pressing process for a ribbed layer.

A raw material for the ribbed layer of the invention may be appropriately selected from carbon fiber and active carbon for a filler, a polymer substance with a sharp distribution of particle diameters such as polyvinyl alcohol, polyethylene, polypropylene, polyvinyl chloride and sugar for a pore regulator and thermosetting resins such as phenol resin for a binder.

A raw material for the non-ribbed layer of the invention may be suitably selected from known materials to be appropriately used depending on to the processes. In the pressing process, a filler may be carbon fiber, granular active carbon or the like, a pore regulator may be the same as for the ribbed layer and a binder may be phenol resin or the like. In the paper-machining process, a filler may be carbon fiber or the like, a pore regulator may be polyvinyl alcohol fiber or the like and a binder may be liquid phenol resin or the like. In the coating process, a filler may be granular active carbon, carbon black or the like, a pore regulator may be the same as the pressing process and a binder may be the same as the paper-machining process.

As an example of the preparation process of the electrode substrate of the present invention will be described hereinafter in more detail, particularly the pressing process using short carbon fiber as a filler, granular polyvinyl alcohol as a pore regulator and powdery phenol resin as a binder.

The raw material for the ribbed layer may comprise a mixture of 30–50% by weight of carbon fiber with an average fiber length of not more than 1 mm and diameter in the range of 3–30 μm, 20–50% by weight of granular polyvinyl alcohol, diameters of at least 70% by weight of the particles being distributed in the range of 100–300 μm, and 10–40% by weight of powdery phenol resin with diameter of not more than 100 μm thoroughly blended by a mixing mill such as a Henschel mixer.

The raw material for the non-ribbed layer of the invention may comprise a similar mixture of the same components as above-mentioned, except that the average fiber length of carbon fiber to be used is longer by 0.1–0.3 mm than that of carbon fiber used for preparing the ribbed layer and the mixed amount of the granular polyvinyl alcohol is larger by 5–20% by weight than that of the granular polyvinyl alcohol used for preparing the ribbed layer. Without this range of mixed amounts, a gas permeability and/or a mechanical strength of a substrate to be obtained will be insufficient for a practical fuel cell.

The mixture for the ribbed layer is fed into a die having a proper configuration by a quantitative feeder such as a belt feeder in a predetermined amount so as to obtain a desired thickness. The mixture for the non-ribbed layer is then fed onto the supplied mixture of the ribbed layer by another feeder in an predetermined amount so as to make two layers.

The supplied mixtures are pressed by a heat press under the suitable conditions selected from die temperature of 100–200° C., molding pressure of 5–100 kg/cm² and molding period of 2–60 minutes. The suitable conditions for molding will be easily determined for those skilled in the art.

The pressed sheet is postcured without pressure for at least 2 hours and thereafter calcinated at 1500–2400° C. in an inert gas atmosphere. In the heating procedure, a slow increase of temperature between 300° C. and 700° C. is preferable since carbonization of polyvinyl alcohol and phenol resin is proceeded in the temperature region.

The electrode substrate of the present invention is markedly suitable for a monopolar fuel cell and a fuel cell may be prepared from the substrates in a conventional manner by stacking cells comprising two substrates and matrix layer therebetween for holding phosphoric acid while disposing a separator plate between two adjacent cells in contact with the ribbed surface of the substrate.

The electrode substrate of the invention has a low electric resistance, a low thermal resistance and a high mechanical strength due to a high bulk density of the ribbed layer, and the non-ribbed layer can hold sufficient amount of catalyst and electrolyte within pores therein due to a low bulk density, and therefore a deterioration of performance of an obtained fuel cell due to dissipation of phosphoric acid may be significantly reduced since the amount of phosphoric acid to be transferred by mutual diffusion of phosphoric acid-hydrogen and phosphoric acid-oxygen or air is remarkably reduced. Furthermore, a high limiting current density is obtained with the electrode substrate of the invention since the catalyst is effectively exerted because of large volume for holding catalyst.

The invention will be illustrated with respect to the following examples. It will be understood, however, that the invention must not be limited to these examples but various modifications may be carried out and those modifications will be also included within the scope of the present invention.

In the examples, the "porosity P (%)" was determined by the following equation while assuming that the real density of a carbonaceous substrate was 1.6 g/cm³;

$$P = (1 - \rho_b/1.6) \times 100$$

wherein $\rho_b$ was the measured bulk density (g/cm³) of a specimen, the "bending strength (kg/cm²)" of a porous carbonaceous shaped article was determined according to Japanese Industrial Standards (JIS) K-6911/1970 while using a specimen with a dimension of 100×10×2.5 mm, and the "pore diameter (μm)" of a specimen was measured by a mercury porosimeter (manufactured by Carlo Erba Strumentazione, Italia). The "gas permeability $Q_a$ (ml/cm².hr.mmAq.)" was determined in the following manner: a cylindrical specimen of 90 mm in diameter was cut out from either layer of a substrate to be measured, the circumferential side surface of the specimen was treated with a thermosetting resin so that gas might not permeate therethrough, both longitudinal end surfaces of the specimen were then put between two cylindrical gas tubes with flange holding a gasket, a predetermined amount (10 l/min) of air was supplied from one end of the specimen to the other end thereof which was open to the atmosphere, the pressure loss between two ends of the specimen was measured by a manometer attached to the upstream of the gas tube and the gas permeability $Q_a$ was then calculated by the following equation;

$$Q_a = \frac{10 \times 60 \times 10^3}{50.24 \times \Delta p}$$

wherein $\Delta p$ was the measured pressure loss (mmAq.) and 50.24 cm² was a real area to be measured (a circle of 80 mm in diameter). Further, the "bulk resistance $\rho_V$ (Ωcm)" was determined in the following manner: both ends of a specimen were coated with an electroconductive coating material and an electrical resistance between two ends of the specimen was measured according to SRIS (Standards of Japan Rubber Association) 2301-1969, and then the bulk resistance was calculated by the following equation;

$$\rho_V = R \cdot w \cdot t / l$$

wherein R was the measured resistance (Ω) between the ends of the specimen, l (cm) was a longitudinal length (direction to be measured), and w (cm) and t (cm) were a horizontal and a vertical lengths, respectively, defining a cross section of the specimen.

EXAMPLE 1

A homogeneous mixture comprising 40% by weight of short carbon fiber with an average fiber length of 0.45 mm and an average fiber diameter of 12 μm (manufactured by Kureha Chemical Industry Co., Ltd.), 30% by weight of polyvinyl alcohol with an average particle diameter of 180 μm (manufactured by The Nippon Synthetic Chemical Industry Co., Ltd.) as a pore regulator and 30% by weight of phenol resin (manufactured by Asahi Organic Material K.K.) as a binder was supplied into a die for press molding. Another homogeneous mixture comprising 45% by weight of the short carbon fiber, 35% by weight of the polyvinyl alcohol and 20% by weight of the phenol resin was fed onto the supplied mixture so as to be a double layer structure.

The mixture of double layer structure was pressed at 140° C. and 50 kg/cm$^2$ for about 30 minutes and then calcinated at 2000° C. for about one hour.

The obtained electrode substrate had ribs with a thickness of 1 mm, a ribbed layer with a bulk density of 0.62 g/cm$^3$, a porosity of 61%, an average pore diameter of 28 $\mu$m and a thickness of 1.6 mm and a non-ribbed layer with a bulk density of 0.51 g/cm$^3$, a porosity of 68%, an average pore diameter of 33 $\mu$m and a thickness of 0.8 mm. The electrode substrate has the excellent physical properties such as a permeability of 320 ml/hr.cm$^2$.mmAq., a bending strength of 165 kg/cm$^2$ and a bulk resistance of $24\times10^{-3}$ $\Omega$cm.

EXAMPLE 2

A mixture of 40% by weight of the short carbon fiber, 30% by weight of the polyvinyl alcohol and 30% by weight of the phenol resin was fed into a die and pressed at 140° C. and 50 kg/cm$^2$ for about 30 minutes to form a ribbed layer.

Carbon fiber with an average length of 10 mm and an average fiber diameter of 12 $\mu$m (manufactured by Kureha Chemical Industry Co., Ltd.) and polyvinyl alcohol fiber with an average fiber diameter of 10 $\mu$m (manufactured by KURARAY CO., LTD.) were mixed in water and subjected to a paper machine followed by drying to obtain a carbon fiber paper.

The carbon fiber paper was laminated via phenol resin on the ribbed layer at 140° C. and 10 kg/cm$^2$ for about 30 minutes. The laminated sheet was calcinated at 2000° C. for about one hour.

The obtained electrode substrate had ribs with 1 mm in thickness, a ribbed layer with 0.62 g/cm$^3$ in bulk density, 61% in porosity, 28 $\mu$m in average pore diameter and 1.6 mm in thickness and a non-ribbed layer with 0.48 g/cm$^3$ in bulk density, 70% in porosity, 42 $\mu$m in average pore diameter and 0.4 mm in thickness. The physical properties were 360 ml/hr. cm$^2$.mmAq. in gas permeability, 154 kg/cm$^2$ in bending strength and $28\times10^{-3}$ $\Omega$cm in bulk resistance.

EXAMPLE 3

A mixture of 40% by weight of the short carbon fiber, 30% by weight of the polyvinyl alcohol and 30% by weight of the phenol resin was supplied into a die and pressed at 140° C. and 50 kg/cm$^2$ for about half an hour.

In the same die, a highly viscous mixture of 50% by weight of liquid phenol resin (manufactured by Gunei Chemical K.K.), 30% by weight of carbon black with an average particle diameter of about 400Å (manufactured by LION CORPORATION) and 20% by weight of the polyvinyl alcohol was coated onto the pressed part and pressed at 140° C. and 10 kg/cm$^2$ for about half an hour.

The pressed product was then calcinated at 2000° C. for about one hour.

The obtained electrode substrate had ribs with 1 mm in thickness on the outer surface of a ribbed layer, a ribbed layer with a bulk density of 0.62 g/cm$^3$, a porosity of 61%, an average pore diameter of 28 $\mu$m and a thickness of 1.6 mm and a non-ribbed layer with a bulk density of 0.43 g/cm$^3$, a porosity of 73%, an average pore diameter of 10 $\mu$m and a thickness of 0.4 mm. The electrode substrate had the physical properties such as a gas permeability of 420 ml/hr.cm$^2$·mmAq., a bending strength of 142 kg/cm$^2$ and a bulk resistance of $31\times10^{-3}$ $\Omega$cm.

What is claimed is:

1. A ribbed porous substrate for a fuel cell electrode, having a bending strength of not less than 50 kg/cm$^2$ and a porosity of 50–80%, not less than 70% of pores being open pores and not less than 60% of the pores having a diameter in the range of 5–50 $\mu$m, which comprises a double layer structure consisting essentially of a ribbed layer having ribs on one side thereof and a non-ribbed layer having flat surface on both sides thereof and having a bulk density lower than the bulk density of the ribbed layer, the non-ribbed layer being laminated onto a flat surface of said ribbed layer and the laminated sheet being calcinated.

2. The substrate of claim 1, in which the bulk density of the ribbed layer is 0.5–0.8 g/cm$^3$ and the bulk density of the non-ribbed layer is 0.4–0.6 g/cm$^3$.

3. The substrate of claim 1 or 2, in which thickness of the ribbed layer excluding the height of the ribs ranges from $\frac{1}{4}$–5/6 of the total substrate thickness when the height of the ribs is not included in said total substrate thickness.

* * * * *